Nov. 14, 1961  R. LEDUC  3,008,336
MECHANICAL SYSTEMS FOR TRANSMITTING CONTROL MOVEMENTS
Filed Nov. 4, 1958
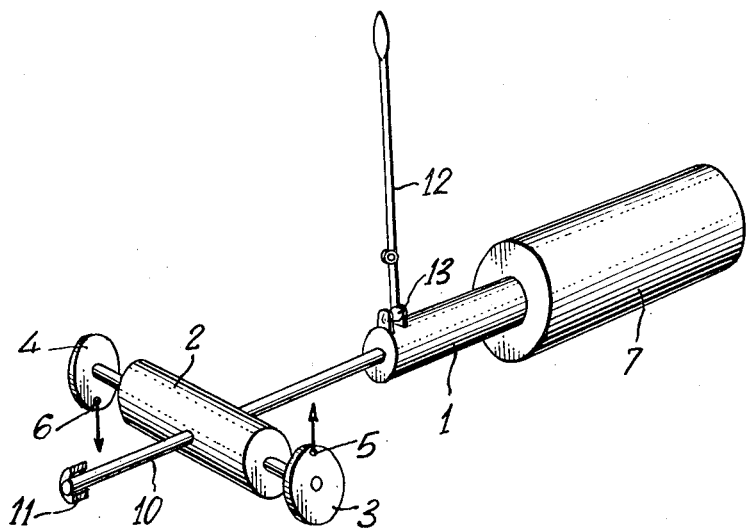
Inventor:
René Leduc
by:
Michael S. Striker
Attorney

United States Patent Office 3,008,336
Patented Nov. 14, 1961

3,008,336
MECHANICAL SYSTEMS FOR TRANSMITTING CONTROL MOVEMENTS
René Leduc, 23 Rue Henri Cloppet, Le Vesinet, France
Filed Nov. 4, 1958, Ser. No. 771,841
Claims priority, application France Dec. 14, 1957
2 Claims. (Cl. 74—61)

The invention relates to mechanical systems for transmitting control movements, for example for the flying controls of aircraft.

In such systems, it is desirable to keep the break-out force, i.e. the force required to overcome the total frictional resistance of the system before any movement can occur, as small as possible.

In a mechanical transmission system comprising push-pull rods, cranks, levers and rocking shafts, the greater part of the total frictional resistance which makes up the break-out force is usually contributed by the sliding friction of the push-pull rods in their bearings, the contribution of the friction in the pivotal or rotational mountings of levers, cranks and rocking shafts being relatively small.

In some cases, however, the greater part of the total frictional resistance may be contributed by the rotation of a control member in or on its bearing, especially if, as may be the case in a hydraulic servo-system, fluid-tight seals must be provided between the control member and its bearing.

It is possible to minimise break-out force by applying to the control system extraneous forces opposing, but not great enough completely to overcome the frictional resistance to control movement. However, once a control movement has been initiated, the continued action of such extraneous forces is liable in some cases to interfere with the correct functioning of the system, especially when accurate positional correspondence between the controlling and controlled members is required, as for instance when the controlling member controls the displacements of a "positional" servo-motor. Consequently, the imposition on a control system of extraneous forces acting in the same direction as the break-out force is usually undesirable.

However, in certain forms of control mechanism the application of extraneous forces acting in the same direction, but not necessarily or continuously in the same sense, as the break-out force is not objectionable, provided certain precautions are observed as hereinafter explained.

The present invention is based on the phenomenon that the coefficient of static friction, sometimes colloquially referred to as "stiction," between any two surfaces, whether "dry" or separated by a film of viscous lubricant, is almost invariably greater than the coefficient of friction when the surfaces are in relative motion, so that, if two members are in sliding contact, relative motion of the members in one direction substantially reduces frictional resistance to relative displacement in a direction at right angles to the direction of motion.

One way of making use of this phenomenon for substantially suppressing the initial frictional resistance to relative movement between a control member and its bearing is to incorporate in the bearing a sleeve or bush to which a continuous or oscillatory rotary motion is imparted. In many cases, however, practical considerations preclude the use of this method.

The main object of this invention is to provide means of utilizing the above-mentioned phenomenon for substantially eliminating the break-out force of a control system, which will be more convenient to install in practice than an arrangement employing a rotary sleeve or bush.

According to this invention, means are provided which impart to a cylindrical control member forming part of a control movement transmission system an oscillatory rotary movement in or on a bearing or bearings in or on which it is longitudinally slidable or rotationally displaceable.

The control member is therefore never at rest in or on its bearing (except instantaneously when the sense of its rotation in or on the bearing changes twice in each oscillatory cycle) and owing to the above-mentioned phenomenon frictional resistance to longitudinal or rotational displacement of the control member in or on its bearing is susbtantially reduced.

Various means may be used for imparting the oscillatory rotational movement to the control member.

In one preferred form of construction, the control member carries a motor, e.g. electric, whose shaft intersects the longitudinal axis of the control member at right angles and is constantly rotated. The shaft carries two substantanially equal eccentric masses, constituting in effect out of balance fly-wheels, and having each a center of mass equally spaced from the axis of the control and equally spaced but in opposite direction from the axis of the shaft. Rotation of the eccentric masses therefore applies an alternating rotational couple to the control member.

In this preferred form of construction, the alternating couple applied to the control member must be sufficiently powerful to overcome the static friction of the control member in or on its bearing.

According to a further feature of the invention, resilient means are incorporated in the system imposing a natural frequency of rotational oscillation of the control member, such frequency being tuned to at least approximate resonance with the oscillatory forcing couple.

In applying the invention to a control member, e.g. a push-pull rod, which slides longitudinally in its bearing for control purposes, it is evident that the oscillatory couple applied to the member about its longitudinal axis will not give rise to any alternating forces acting in longitudinal direction on the member or cause any longitudinal movement thereof.

The accompanying drawing schematically illustrates, by way of example only, a preferred embodiment of the invention in perspective.

The only figure of the drawing shows a push-pull control member or rod 1 of circular section which slides in a fixed bearing 7. A torsionally resilient bar 10, forming an extension of the rod 1, is supported in a second bearing 11. Sliding displacement is communicated to the assembly 1, 10 by a lever 12 through a ball joint 13.

The bar 10 is in two parts, the two parts being connected by a cross-member 2, constituting the housing of a small electric motor driving a shaft, whose axis intersects at right angles that of bar 10 and extends on either side thereof and carries at its extremities, equidistant from bar 10, wheels 3 and 4, eccentrically loaded by weights 5 and 6 which are diametrically opposite one another when viewed in the axial direction of the shaft of the motor 2. The centrifugal forces exerted by the weights 5 and 6 are indicated by arrows. As the wheels 4 and 5 rotate these forces set up an oscillating couple on bar 10 and rod 1 connected thereto, acting in the plane perpendicular to its axis and causing it to oscillate rotationally.

The torsion bar 10 forming an extension of rod 1 enables the amplitude of oscillation of rod 1 to be augmented by resonance.

In the arrangement illustrated in and described in the present application the oscillating forces acting on rod 1 have no unbalanced axial component.

What I claim is:
1. In a control movement transmission system, in combination, an elongated control member movable during the control movement in axial direction; bearing means mounting said control member slidable in axial direction and turnable about its axis; operating means operatively connected to said control member for moving the latter during the control movement in axial direction; oscillating means operatively connected to said control member for oscillating the latter about its axis without imparting to said member a movement in said axial direction of said control movement, said oscillating means comprising a shaft intersecting the axis of said control member and extending susbtantially normal to said axis, a pair of substantially equal eccentric masses mounted on said shaft and having each a center of mass equally spaced from the axis of said control member and spaced equally but in opposite directions from the axis of said shaft, and means for continuously rotating said shaft; and torsionally resilient means coaxial with said control member for connecting said control member with said oscillating means, whereby the static friction of said control member in said bearing means is reduced without influencing the exact control movement of said control member imparted thereto by said operating means.

2. In a control movement transmission system, in combination, an elongated control member movable during the control movement in axial direction; bearing means mounting said control member slidable in axial direction and turnable about its axis; operating means operatively connected to said control member for moving the latter during the control movement in axial direction; and oscillating means for oscillating the latter about its axis without imparting to said member a movement in said axial direction of said control movement, said oscillating means comprising torsionally resilient means fixed to and coaxial with said control member, a shaft operatively connected to said torsionally resilient means and having an axis intersecting the axis of said torsionally resilient means and extending substantially normal thereto, a pair of substantially equal eccentric masses mounted on said shaft and having each a center of mass equally spaced from the axis of said control member and spaced equally but in opposite directions from the axis of said shaft, and means for continuously rotating said shaft with a rotational speed so that the oscillations created are in resonance with the natural frequency of oscillation of said torsionally resilient means and the assembly constituted by said shaft, said eccentric masses mounted thereon and said means for rotating said shaft, whereby the static friction of said control member in said bearing means is reduced without influencing the exact control movement of said control member imparted thereto by said operating means.

References Cited in the file of this patent

OTHER REFERENCES

| | | |
|---|---|---|
| 1,459,841 | Mitchell | June 26, 1923 |
| 1,489,319 | Goldschmidt | Apr. 8, 1924 |
| 1,625,361 | Henderson | Apr. 19, 1927 |
| 1,787,529 | Jackson | Jan. 6, 1931 |
| 1,921,983 | Wittkuhns | Aug. 8, 1933 |
| 2,236,340 | Marggraf | Mar. 25, 1941 |
| 2,746,813 | Massa | May 22, 1956 |
| 2,807,966 | Servanty | Oct. 1, 1957 |
| 2,836,986 | Kretz | June 3, 1958 |